(12) United States Patent
Johnson et al.

(10) Patent No.: US 7,716,863 B1
(45) Date of Patent: May 18, 2010

(54) SELF POWERING PROGNOSTIC GUN TAG

(75) Inventors: Mark A. Johnson, West Sand Lake, NY (US); Andrew G. Littlefield, Troy, NY (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 121 days.

(21) Appl. No.: 11/671,238

(22) Filed: Feb. 5, 2007

Related U.S. Application Data

(60) Provisional application No. 60/766,729, filed on Feb. 8, 2006.

(51) Int. Cl.
*F41A 9/62* (2006.01)
*G01L 5/14* (2006.01)

(52) U.S. Cl. .................. 42/1.02; 42/1.01; 42/1.03; 73/167; 73/11.04; 73/760

(58) Field of Classification Search ......... 42/1.01–1.05; 73/167, 11.04, 760
See application file for complete search history.

(56) References Cited

U.S. PATENT DOCUMENTS

| | | | | |
|---|---|---|---|---|
| 3,765,235 A | * | 10/1973 | Morrow | 73/167 |
| 3,914,996 A | * | 10/1975 | Davis et al. | 73/167 |
| 4,001,961 A | * | 1/1977 | Johnson et al. | 42/1.03 |
| 4,843,887 A | * | 7/1989 | Engeler et al. | 73/730 |
| 5,005,307 A | * | 4/1991 | Horne et al. | 42/1.02 |
| 5,052,138 A | * | 10/1991 | Crain | 42/1.02 |
| 5,142,805 A | * | 9/1992 | Horne et al. | 42/1.02 |
| 5,303,495 A | * | 4/1994 | Harthcock | 42/84 |
| 5,307,053 A | * | 4/1994 | Wills et al. | 340/573.1 |
| 5,349,853 A | * | 9/1994 | Oehler | 73/167 |
| 5,437,117 A | * | 8/1995 | Mackey, III | 42/1.01 |
| 5,799,432 A | * | 9/1998 | Wright et al. | 42/1.02 |
| 5,826,360 A | * | 10/1998 | Herold et al. | 42/1.02 |
| 5,918,304 A | * | 6/1999 | Gartz | 89/1.1 |
| 6,643,968 B2 | * | 11/2003 | Glock | 42/1.02 |
| 6,817,239 B2 | * | 11/2004 | Glock | 73/167 |
| 2003/0061753 A1 | * | 4/2003 | Glock | 42/1.02 |
| 2004/0200109 A1 | * | 10/2004 | Vasquez | 42/1.01 |
| 2007/0144396 A1 | * | 6/2007 | Hamel et al. | 102/472 |
| 2008/0131848 A1 | * | 6/2008 | Wilson et al. | 434/24 |

* cited by examiner

*Primary Examiner*—Bret Hayes
*Assistant Examiner*—Michael D David
(74) *Attorney, Agent, or Firm*—Michael C. Sachs

(57) ABSTRACT

An apparatus for counting and storing a number of rounds fired from a gun includes a microcomputer; a non-volatile memory connected to the microcomputer; and at least one piezoelectric transducer connected to the microcomputer and mounted on the gun, the at least one piezoelectric transducer comprising a power source that generates power during operation of the gun. The piezoelectric transducer may also sense the firing of the gun.

2 Claims, 2 Drawing Sheets

SELF POWERING PROGNOSTIC GUN TAG

CROSS-REFERENCE TO RELATED APPLICATIONS

This application claims the benefit under 35 USC 119(e) of U.S. provisional patent application No. 60/766,729 filed on Feb. 8, 2006, which application is hereby incorporated by reference.

STATEMENT OF GOVERNMENT INTEREST

The inventions described herein may be manufactured, used and licensed by or for the U.S. Government for U.S. Government purposes.

BACKGROUND OF THE INVENTION

The invention relates in general to munitions and in particular to large caliber gun tubes and breech mechanisms. Large caliber gun tubes and breech mechanisms are components of, for example, cannons, mortars, recoilless rifles and howitzers.

Large caliber gun tubes and breech mechanisms are expensive. It is desired to use a gun tube and/or breech mechanism as long as possible. However, these systems may become ineffective and potentially dangerous when operated beyond their useful service life. A significant component of the service life is the historical firing information. In the absence of this information, the system will require additional costly inspections or be prematurely removed from service.

One way to track the activity of a gun tube is with a Weapon Data Record Card. The Weapon Data Record Card includes the number and type of each round fired from a particular gun tube. A soldier manually records the data on the Weapon Data Record Card. The card is stored with the gun tube. A record of the number of tubes used with each breech mechanism is also recorded manually and stored with the breech.

Unfortunately, the Weapon Data Record Cards are often lost and the component has to be either inspected in the field or condemned prematurely. The costs associated with this procedure are high and critical information of the firing history is permanently gone. The administrative responsibilities associated with maintaining accurate information of the Weapon Data Record cards is often an unreasonable requirement for the soldier in the field. Devices similar to those tested on small caliber munitions were determined to be ineffective or untested for large caliber gun tubes and breech mechanisms. In addition, these devices require an external battery to operate. Periodic battery replacement is an unacceptable additional maintenance requirement. There is a need for a device for monitoring the firing history of gun components that requires no periodic maintenance.

SUMMARY OF THE INVENTION

It is an object of the invention to provide an apparatus to reliably record the firing history of gun components while reducing the administrative responsibilities of the soldier.

It is another object of the invention to provide an apparatus to reliably record the firing history of gun components wherein the apparatus operates with no external power source.

It is a further object of the invention to provide an apparatus to reliably record the firing history of gun components to thereby avoid premature condemnation of gun tubes and/or breech mechanism resulting from lost or inaccurate record keeping.

One aspect of the invention is an apparatus for counting and storing a number of rounds fired from a gun comprising a microcomputer; a non-volatile memory connected to the microcomputer; and at least one piezoelectric transducer connected to the microcomputer and mounted on the gun, the at least one piezoelectric transducer comprising a power source that generates power during operation of the gun.

In one embodiment, the at least one piezoelectric transducer further comprises a firing sensor that senses a firing of the gun. Or, the at least one piezoelectric transducer may comprise two piezoelectric transducers wherein a first piezoelectric transducer comprises the power source that generates power during the operation of the gun and a second piezoelectric transducer comprises the firing sensor that senses the firing of the gun.

In another embodiment, the apparatus further comprises an accelerometer connected to the microcomputer and mounted on the gun. The accelerometer may comprise a firing sensor that senses a firing of the gun and/or a type of round sensor.

Preferably, the apparatus further comprises a radio frequency circuit and a remote computer for accessing the non-volatile memory via the radio frequency circuit.

The non-volatile memory stores one or more of a number of rounds fired; a number of each type of round fired; gun recoil acceleration profiles for every round fired; and radial strain magnitudes for every round fired.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

The invention includes an apparatus that mounts to a gun tube or breech and maintains a permanent firing history. The apparatus includes one or more transducers that directly monitor key characteristics of gun response to fired rounds. The invention eliminates the administrative responsibilities associated with maintaining Weapon Data Record Cards. No external power source (i.e. battery) is required. When the gun fires, the firing history is updated and stored permanently in a non-volatile memory, such as an Electrically Erasable Programmable Read-Only Memory, here throughout also referred to as an EEPROM.

In one embodiment, power for the apparatus is derived from the response of piezoelectric material to gun recoil, or the radial strain of the gun tube associated with the pressure pulse. In some embodiments, a nanowatt microcomputer determines the round type based on the acceleration profile of the gun recoil or the magnitude of the radial strain. The stored firing information may be extracted remotely from the non-volatile memory via radio frequency, using power derived from the interrogating device. The stored firing information may include: 1) the total number of rounds fired; and 2) the number of each specific type of round fired or sensor data for remotely determining the number of each specific type of round fired. The apparatus is permanently mounted to the gun tube or gun breech so that the firing information becomes an integral and permanent part of the component.

Figure 1:
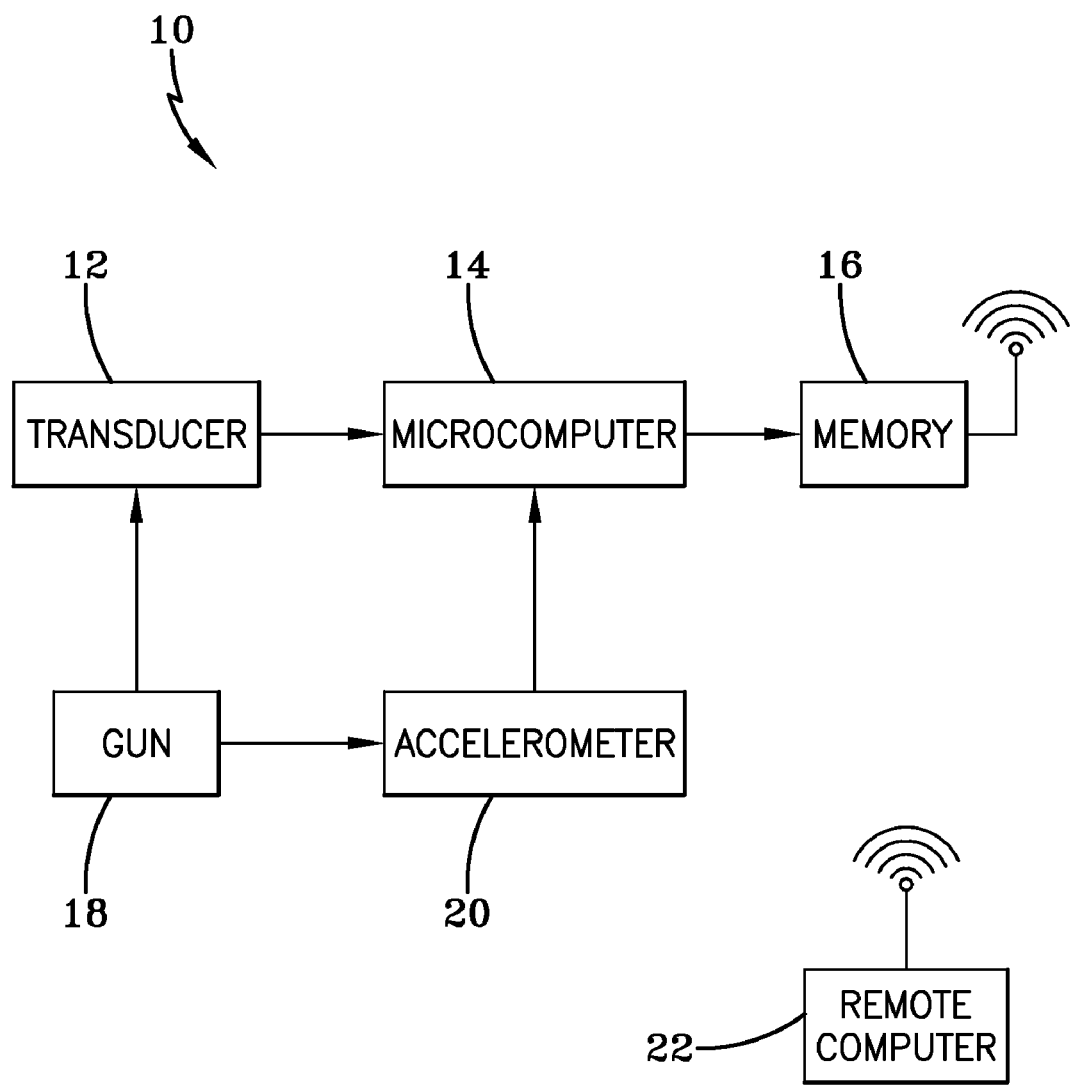
FIG. 1 is a block diagram of one embodiment of an apparatus in accordance with the invention.

FIG. 1 is a block diagram of one embodiment of an apparatus 10 in accordance with the invention. Apparatus 10 counts and stores the number and/or type of rounds fired from the gun 18. If mounted on the barrel of gun 18, apparatus 10 stores the firing history of the barrel. If mounted on the breech of gun 18, apparatus 10 stores the firing history of the breech. Apparatus 10 includes a low-power microcomputer 14, preferably a nanowatt microcomputer. Microcomputer 14 is connected to a non-volatile memory 16, for example, an EEPROM.

At least one piezoelectric transducer 12 is connected to the microcomputer 14 and mounted on the gun 18 (barrel or breech). The piezoelectric transducer 12 functions as a power source during operation of the gun 18. One type of power generating piezoelectric transducer comprises a mass that accelerates due to recoil of the gun 18. The force of the mass against the piezo-crystal generates power. This type of transducer may be used on either the barrel or the breech of gun 18, because both the barrel and breech recoil during operation of the gun 18. Another type of piezoelectric transducer 12 is sensitive to the radial strain of the barrel during a firing event and generates power as a result of the radial strain of the barrel. The radial strain type of transducer may not be suitable for the breech because the amount of radial strain at the breech may be too small.

The at least one piezoelectric transducer 12 further functions as a firing sensor that senses a firing of the gun 18. In the case of the accelerating mass type of transducer, the acceleration of the mass not only generates power, but also indicates a firing event, due to recoil of the gun 18. In the case of the radial strain transducer, the radial strain generates power and also indicates the firing of the gun due to radial strain of the barrel. Of course, rather than a single transducer 12 that both generates power and senses a firing event, two separate transducers 12 may be used, one for generating power and one for sensing the firing event. Both transducers 12 are connected to the microcomputer 14.

Apparatus 10 may further comprise an accelerometer 20 connected to the microcomputer 14 and mounted on the gun 18 (barrel or breech). The accelerometer 20 senses a firing event due to recoil of the gun 18. When using the accelerometer 20, the piezoelectric transducer 12 may function only as a power-generating source and need not independently sense the firing event.

In another embodiment of the invention, the accelerometer 20 further comprises a "type of round" sensor that senses the acceleration profile of the gun recoil. In this embodiment, a "database" of gun recoil acceleration profiles is created for each of the known types of rounds that may be fired from the gun 18. This database may be created empirically by firing known types of rounds from the gun 18, sensing the acceleration profile of the gun recoil for each type of round and storing the acceleration profiles in the non-volatile memory 16 of the apparatus 10, or in a remote computer 22. Alternatively, the database may be created mathematically.

Then, whenever a round is fired from the gun 18, the accelerometer 20 senses the acceleration profile of the gun recoil and sends this information to the microcomputer 14. In one embodiment, the microcomputer 14 compares the sensed acceleration profile to the known acceleration profiles stored in memory 16 and determines the type of round that was fired. In another embodiment, the sensed acceleration profiles are stored in memory 16 and then remotely accessed via radio frequency link by remote computer 22. Remote computer 22 then compares the sensed acceleration profiles retrieved from memory 16 to the known acceleration profiles stored in its own memory and determines the type of round that was fired.

In another embodiment of the apparatus 10, the at least one piezoelectric transducer 12 may comprise the "type of round" sensor. In this case, the piezoelectric transducer 12 comprises a mass that accelerates due to recoil of the gun 18. The voltage produced by the transducer 12 is proportional to the gun acceleration and is used to create a sensed acceleration profile that is used as described above with respect to accelerometer 20.

In still another embodiment of the invention, the piezoelectric transducer 12 may measure the magnitude of the radial strain of the gun tube. In this embodiment, a "database" of radial strain magnitudes is created for each of the known types of rounds fired from the gun 18. This database may be created empirically or mathematically in a manner analogous to the database of acceleration profiles for different types of rounds. The database is stored either in memory 16 or in remote computer 22.

Then, whenever a round is fired from the gun 18, the transducer 12 senses the magnitude of the radial strain of the gun tube and sends this information to the microcomputer 14. In one embodiment, the microcomputer 14 compares the sensed radial strain to the known radial strain magnitudes stored in memory 16 and determines the type of round that was fired. In another embodiment, the sensed radial strains are stored in memory 16 and then remotely accessed via radio frequency link by remote computer 22. Remote computer 22 then compares the sensed radial strains retrieved from memory 16 to the known radial strain magnitudes stored in its own memory and determines the type of round that was fired.

Figure 2:
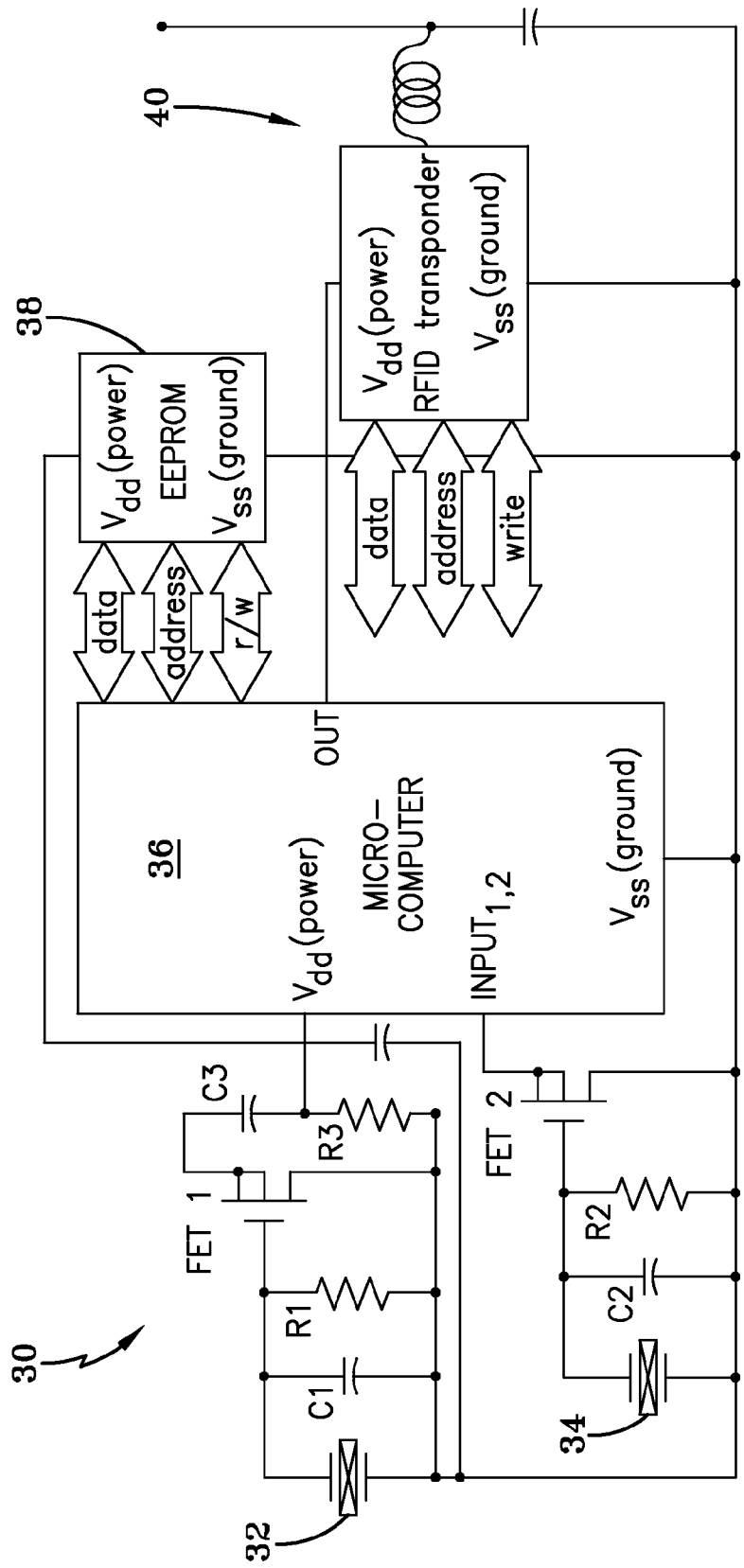
FIG. 2 is an electrical schematic of an embodiment of the invention.

FIG. 2 is an electrical schematic of an embodiment of the invention. Apparatus 30 includes a microcomputer 36 connected to a non-volatile memory 38. A power generating piezoelectric transducer 32 is connected to the microcomputer 36 and mounted on a gun (not shown). Another piezoelectric transducer 34 is mounted on the gun and senses a firing event of the gun. Transducer 34 may sense only the occurrence of a firing event, which occurrence is then stored in memory 38. Or, the transducer 34 may also sense "type of round" information, such as the acceleration profile of the gun recoil or the magnitude of the radial strain. As already discussed, the acceleration profile of the gun recoil or the magnitude of the radial strain may be stored in memory 38 for later retrieval by a remote computer, wherein the remote computer then determines the type of round based on the retrieved information. Or, the acceleration profile of the gun recoil or the magnitude of the radial strain may be compared by microcomputer 36 to a database stored in memory 38 to determine the type of round fired.

So that the non-volatile memory 38 may be accessed remotely, a radio frequency circuit 40 is included. At a minimum, the information retrieved from memory 38 is the number of rounds fired. In the embodiments where the microcomputer 36 determines the type of round fired, the information retrieved also includes the number of each type of round fired. In the embodiments where the remote computer determines the type of round fired, the information retrieved is the gun recoil acceleration profile or radial strain magnitude for each round fired. The apparatus 30 does not require power when a radio frequency interrogator accesses the memory 38.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A system for automatically determining and automatically storing the number of each type of round fired from a gun barrel of a large caliber gun further including a breech, said system comprising the combination of said large caliber gun with:

a piezoelectric transducer on the gun barrel to measure radial strain on the barrel occurring during firing of various types of rounds and said transducer generating radial strain voltages unique to the type of round that was fired; and a microcomputer including a memory to which said radial strain voltages are fed, said memory having a data base of past radial strain voltages for each unique type of round, for comparison by the microcomputer to estimate which type of round is currently fired, and to record the current firing event information for later counting and retrieval; and an accelerometer also attached to said gun barrel to measure recoil of the gun barrel occurring during firing of various types of rounds, said accelerometer generating gun recoil profile voltages unique to the type of round that was fired, said gun recoil profile voltages also fed to the microcomputer and memory for storage and comparison through use in the memory of a data base of past gun recoil profile voltages for each unique type of round, to further estimate which type of round is currently fired, and to also record this current firing information for later counting and retrieval, and further wherein the microcomputer is powered by the output voltages from the piezoelectric transducer and the accelerometer; and radio means for transmitting signals from the memory of said system to a location remote from said memory; and wherein said memory signals may be remotely accessed through said radio means to determine the number of rounds of each type which had been fired by use of either the radial strain voltages records or the gun recoil profile voltages records, or by use of both records, for comparison.

2. The system of claim 1 wherein the accelerometer is attached to the breech, rather than to the gun barrel.

* * * * *